US012431142B2

United States Patent
Yun et al.

(10) Patent No.: US 12,431,142 B2
(45) Date of Patent: Sep. 30, 2025

(54) APPARATUS AND METHOD FOR IMPROVING CONTEXT-BASED AUTOMATIC INTERPRETATION PERFORMANCE

(71) Applicant: ELECTRONICS AND TELECOMMUNICATIONS RESEARCH INSTITUTE, Daejeon (KR)

(72) Inventors: Seung Yun, Daejeon (KR); Jeonguk Bang, Daejeon (KR); Min Kyu Lee, Daejeon (KR); Sanghun Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 280 days.

(21) Appl. No.: 18/085,889

(22) Filed: Dec. 21, 2022

(65) Prior Publication Data

US 2023/0290360 A1 Sep. 14, 2023

(30) Foreign Application Priority Data

Jan. 6, 2022 (KR) .......................... 10-2022-0002266

(51) Int. Cl.
*G10L 19/00* (2013.01)
*G10L 25/78* (2013.01)

(52) U.S. Cl.
CPC .............. *G10L 19/00* (2013.01); *G10L 25/78* (2013.01)

(58) Field of Classification Search
CPC ....... G10L 19/00; G10L 25/78; G10L 15/005; G10L 15/063; G10L 15/16; G10L 15/183;
(Continued)

(56) References Cited

U.S. PATENT DOCUMENTS 11,056,103 B2 7/2021 Kim et al.
2013/0218578 A1* 8/2013 Gao ........................ G10L 19/12
704/500
(Continued)

FOREIGN PATENT DOCUMENTS

KR 1020180005850 A 1/2018
KR 20190046124 A 5/2019
(Continued)

OTHER PUBLICATIONS

Devlin J. et al., "BERT: Pre-training of Deep Bidirectional Transformers for Language Understanding". 2019, Google AI Language.

*Primary Examiner* — Darioush Agahi
(74) *Attorney, Agent, or Firm* — Rabin & Berdo, P.C.

(57) ABSTRACT

An apparatus for improving context-based automatic interpretation performance includes: an uttered voice input unit configured to receive a voice signal from a user; a previous sentence input unit configured to determine whether there is a user's previous utterance when the voice signal is input by the uttered voice input unit; a voice encoding processing unit configured to decode only the voice signal through the uttered voice input unit when it is determined that there is no user's previous utterance and extract a vector of the voice signal when it is determined that there is the user's previous utterance; a context encoding processing unit configured to extract a context vector from a previous utterance when there is the previous utterance and transmit the extracted context vector of the previous utterance; and an interpretation decoding processing unit configured to output an interpretation result text.

6 Claims, 6 Drawing Sheets

(58) Field of Classification Search
CPC ..... G10L 15/04; G10L 15/26; G10L 19/0018; G06F 40/284; G06F 40/35; G06F 40/58; G06F 40/289; G06N 20/00
See application file for complete search history.

(56) References Cited

U.S. PATENT DOCUMENTS

| | | | |
|---|---|---|---|
| 2019/0130073 A1* | 5/2019 | Sun | G16H 10/60 |
| 2020/0134021 A1* | 4/2020 | Moore | G06F 3/0484 |
| 2021/0004723 A1* | 1/2021 | Kanno | G06N 20/00 |
| 2021/0049997 A1 | 2/2021 | Yun et al. | |
| 2021/0104232 A1* | 4/2021 | Lee | G06N 3/08 |
| 2022/0366143 A1* | 11/2022 | Zhang | G06N 3/0895 |
| 2023/0153532 A1* | 5/2023 | He | G06N 5/04 |
| | | | 704/8 |
| 2024/0354320 A1* | 10/2024 | Procter | G06F 40/103 |
| 2024/0420692 A1* | 12/2024 | Gaur | G10L 15/005 |

FOREIGN PATENT DOCUMENTS

| | | | |
|---|---|---|---|
| KR | 20200029930 A | 3/2020 | |
| KR | 1020200102308 A | 8/2020 | |

* cited by examiner

APPARATUS AND METHOD FOR IMPROVING CONTEXT-BASED AUTOMATIC INTERPRETATION PERFORMANCE

CROSS-REFERENCE TO RELATED APPLICATION

This application claims priority to and the benefit of Korean Patent Application No. 10-2022-0002266, filed on Jan. 6, 2022, the disclosure of which is incorporated herein by reference in its entirety.

TECHNICAL FIELD

The present invention relates to a method and apparatus for improving context-based automatic interpretation performance using a multilingual embedding language model.

BACKGROUND

With the development of speech recognition, automatic translation, and voice synthesis technology, automatic interpretation technologies are spreading widely.

Both the speech recognition technology and the automatic translation technology adopted a deep neural network-based development methodology to significantly improve performance compared to the past. In particular, in recent years, end-to-end automatic interpretation technologies have been actively developed to prevent speech recognition errors from propagating to automatic translation.

However, when attempting to input information on a previous utterance, there is a limitation in that it is difficult to explicitly use a recognition result text because there are two or more different languages due to the nature of automatic interpretation.

For example, assuming the Korean-English automatic interpretation situation, there is no way to input a speech recognition result of a previous utterance uttered by Korean along with a voice of the next English user.

SUMMARY

The present invention provides an apparatus for improving context-based automatic interpretation performance capable of inputting a context vector value based on a multilingual embedding language model of a previous utterance together when training a multilingual embedding language model with an interpretation target language or inputting a voice signal corresponding to a current utterance regardless of a language of the previous utterance using a previously created multilingual embedding language model including the interpretation target language.

An object of the present invention is not limited to the above-mentioned aspect, and other objects that are not mentioned may be obviously understood by those skilled in the art from the following specification.

According to an aspect of the present invention, an apparatus for improving context-based automatic interpretation performance includes an uttered voice input unit configured to receive a voice signal from a user; a previous sentence input unit configured to transmit a user's previous utterance when the voice signal is input by the uttered voice input unit; a voice encoding processing unit configured to decode only the voice signal through the uttered voice input unit and transmit a vector; a context encoding processing unit configured to extract a context vector from a previous utterance when there is the previous utterance and transmit the extracted context vector of the previous utterance; and an interpretation decoding processing unit configured to output an interpretation result text by performing decoding on interpretation using vector attention information of the extracted voice signal and attention information of the extracted context vector of the previous utterance when it is determined by the previous sentence input unit that there is a user's previous utterance based on a multilingual embedding language model.

When it is determined by the previous sentence input unit that there is no user's previous utterance, the interpretation decoding processing unit may perform decoding using only the voice signal decoded through the voice encoding processing unit.

The multilingual embedding language model may include: a learning information collection unit configured to collect a sufficient amount of interpretation target language multilingual text to train the embedding language model; a preprocessing unit configured to delete an inappropriate symbol from the collected text or convert the inappropriate symbol into specific text; a tokenizing processing unit configured to tokenize the preprocessed text into a preset form; an embedding processing unit configured to embed the tokenized text to correspond to multilingual text; and a multilingual embedding language model learning unit configured to train the embedded multilingual text.

The tokenizing may be performed in a form of one of a syllable, a word, a word segment, or a byte pair encoding (BPE) token that has a preset length.

The embedding processing unit may simultaneously use token embedding, segment embedding, and position embedding.

The multilingual embedding language model learning unit may learn a language model encoder by using techniques such as a masked language model and a next sentence prediction, attention, and the like.

The multilingual embedding language model may transform a dimensional space so that the interpretation target language is positioned in spaces similar to each other.

The multilingual embedding language model may be to update a learning result using trained model weights after transforming architecture to a new purpose based on a previously trained multilingual embedding language model.

According to another aspect of the present invention, a method of improving context-based automatic interpretation performance may include: collecting multilingual text that is an interpretation target language; pre-processing the collected text; tokenizing the preprocessed text; embedding the tokenized text as multilingual text; and performing training using a context prediction model and an attention language model.

The context prediction model may be one of a masked language model and a next sentence prediction model.

In the embedding, one or a plurality of methods of token embedding, segment embedding, and position embedding may be simultaneously used.

In the tokenizing, the tokenizing may be performed in one of forms of a syllable, a word, a word segment, or a byte pair encoding (BPE) token that has a preset length.

The context prediction model may transform a position of an interpretation target language into a space similar to each other.

The context prediction model may perform domain text-based fine tuning on a basic multilingual embedding model composed of general text when an interpretation target domain is a special or restricted domain.

A method of improving context-based automatic interpretation performance may include: receiving a voice signal from a user; determining whether there is a previous utterance; extracting, by a context encoder, a context vector from the previous utterance when it is determined in the determining that there is the previous utterance; encoding, by a voice encoder, a user's voice when the user's voice input is completed; and performing, by an interpretation decoder, interpretation using the context vector extracted by the context encoder and the voice vector extracted by the voice encoder.

The method may further include performing, by the interpretation decoder, decoding using only a user's voice signal encoded by the voice encoder when it is determined in the determining that there is no previous utterance.

In the extracting of the context vector, a multilingual embedding language model may be used.

DETAILED DESCRIPTION OF EMBODIMENTS

Various advantages and features of the present invention and methods accomplishing them will become apparent from the following description of embodiments with reference to the accompanying drawings. However, the present invention is not limited to exemplary embodiments to be described below, but may be implemented in various different forms, these embodiments will be provided only in order to make the present invention complete and allow those skilled in the art to completely recognize the scope of the present invention, and the present invention will be defined by the scope of the claims. Meanwhile, terms used in the present specification are for explaining exemplary embodiments rather than limiting the present invention. Unless otherwise stated, a singular form includes a plural form in the present specification. Components, steps, operations, and/or elements mentioned by terms "comprise" and/or "comprising" used in the present specification do not exclude the existence or addition of one or more other components, steps, operations, and/or elements.

Figure 1:
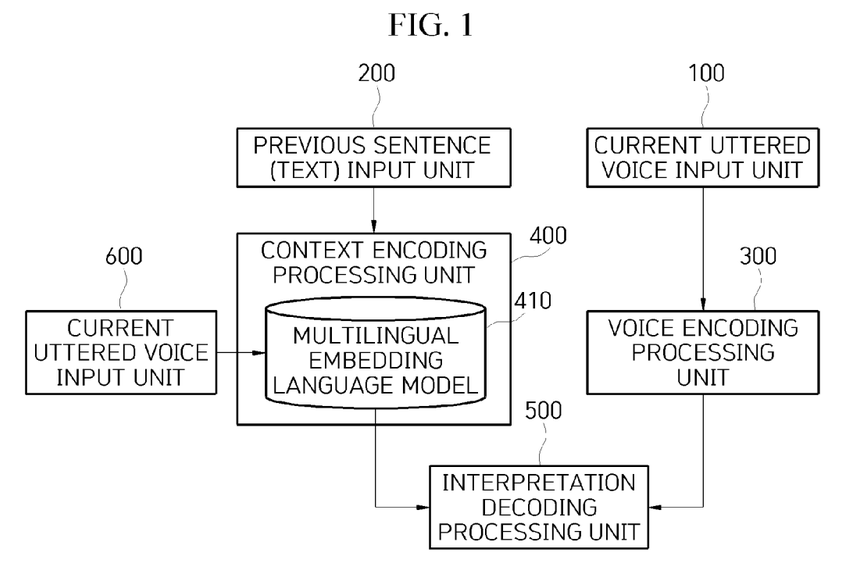
FIG. 1 is a block configuration diagram illustrating an apparatus for improving context-based automatic interpretation performance according to an embodiment of the present invention.

FIG. 1 is a block configuration diagram illustrating an apparatus for improving context-based automatic interpretation performance according to an embodiment of the present invention.

In FIG. 1, an apparatus for improving context-based automatic interpretation performance according to an embodiment of the present invention includes an uttered voice input unit 100, a previous sentence input unit 200, a voice encoding processing unit 300, a context encoding processing unit 400, and interpretation decoding processing unit 500.

The uttered voice input unit 100 receives a voice signal from a user and transmits the received voice signal to the voice encoding processing unit 300.

When the voice signal is input by the uttered voice input unit 100, the previous sentence input unit 200 transmits a user's previous utterance to the context encoding processing unit 400.

The voice encoding processing unit 300 decodes only the voice signal through the uttered voice input unit 100 and transmits the vector to the interpretation decoding processing unit 500.

The context encoding processing unit 400 extracts the context vector of the previous utterance using the multilingual embedding language model 410, and transmits the extracted context vector of the previous utterance to the interpretation decoding processing unit 500.

Figure 2:
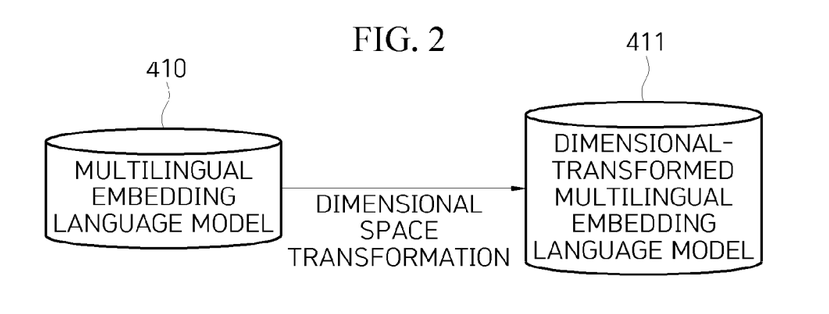
FIG. 2 is a reference diagram for describing an embodiment of a multilingual embedding language model to which dimensional space transformation is applied.

FIG. 2 is a block diagram illustrating dimensional transformation of a multilingual embedding language model according to an embodiment of the present invention. When the previously trained multilingual embedding model is used without training a new multilingual embedding model, if the interpretation target language is positioned in a similar space to each other, it is more effective when a context vector is applied, so a multilingual embedding model S411 that transforms a dimensional space may be constructed for this purpose.

Figure 3:
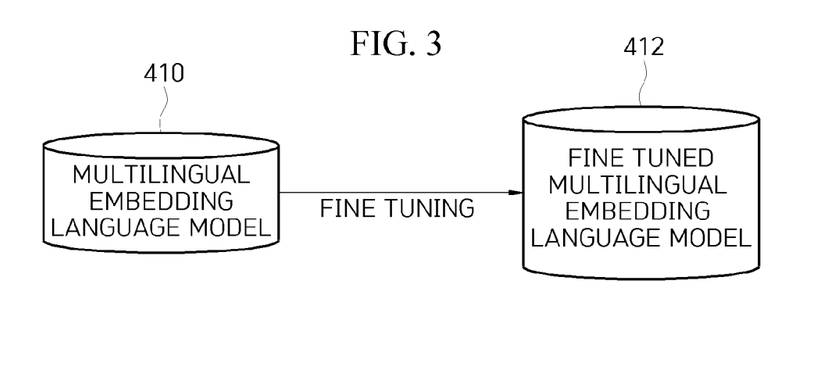
FIG. 3 is a reference diagram for describing an embodiment of a multilingual embedding language model learning model to which a fine tuning process is applied.

FIG. 3 is a block configuration diagram illustrating a fine tuning process of a multilingual embedding model according to an embodiment of the present invention. When the interpretation target domain is a special or restricted domain, the fine tuned multilingual embedding model S412 may be configured so that a basic multilingual embedding model composed of general text may be subjected to the domain text-based fine tuning to better model the domain. Here, the fine tuning refers to a method of transforming architecture to a new purpose based on a previously trained model and updating a learning result from the previously trained model weights. However, since this is also not a necessary process, it may be applied voluntarily depending on the situation.

When it is determined by the previous sentence input unit 200 that there is the user's previous utterance based on the multilingual embedding language model, the interpretation decoding processing unit 500 uses the extracted vector attention information of the voice signal and the extracted attention information of the context vector of the previous utterance to decode the interpretation and output the interpretation result text.

Meanwhile, when it is determined by the previous sentence input unit that there is no user's previous utterance, the interpretation decoding processing unit 500 performs decoding necessary for the interpretation using only the voice signal decoded through the voice encoding processing unit 300 to output the interpretation result text.

According to an embodiment of the present invention, an automatic interpretation server of the present invention receives a context vector of a previous utterance along with a voice signal of a current utterance, so, in addition to the currently input voice signal, previous context information affecting the current utterance may be used for automatic interpretation, thereby improving the performance of the automatic interpretation system.

In addition, according to the embodiment of the present invention, even in a cascade system in which a speech recognizer and an automatic translator are connected step by step rather than an end-to-end automatic interpretation system, when inputting the speech recognizer or the automatic translator, it is possible to improve performance of individual speech recognizers and automatic translators by inputting a context vector value of a previous utterance together.

In addition, according to the embodiment of the present invention, the present embodiment can be applied even in an automatic interpretation situation in which two or more n languages are mixed, and in this situation, when a multilingual embedding language model including all the languages is used, the same effects can be obtained.

As can be seen in the example below, when the previous utterance is reflected in this way, the interpretation result is advantageously changed, and thus, it can be seen that the interpretation performance is improved.

For a voice of "One is South Korea," it is interpreted as "한 명은 한국입니다," but, as in Example 1, when "한 곳은 미국입니다" is given as a previous utterance, it is interpreted as "한 곳은 한국입니다," and as in Example 2, when "한 명은 미국인입니다" is given, it is interpreted as "명은 한국인입니다."

TABLE 1

| | Example 1 | Example 2 |
|---|---|---|
| Previous utterance | 한 곳은 미국입니다. | 한 명은 미국인입니다. |
| Voice signal input | One is South Korea | |
| Original interpretation result | 한 명은 한국입니다. | |
| Context-reflected interpretation result | 한 곳은 한국입니다. | 한 명은 한국인입니다. |

Figure 4:
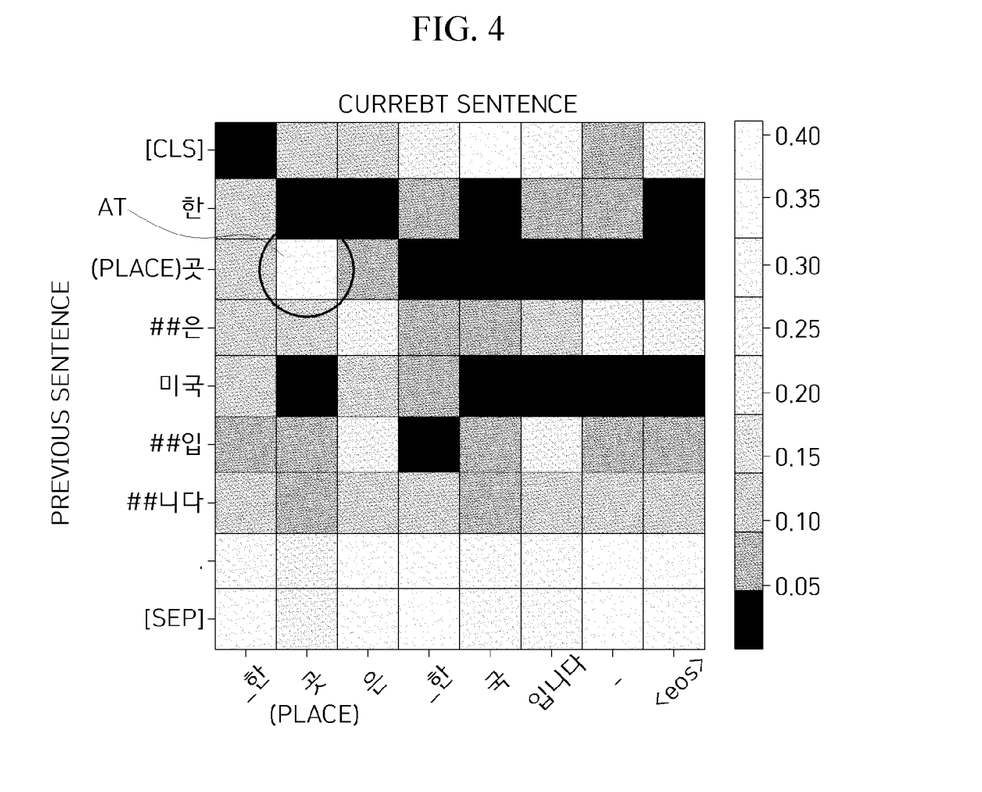
FIG. 4 is a reference diagram for describing an attention map used in a context encoding processing unit.

As illustrated in FIG. 4, when an attention map is created for Example 1 above, it can be seen that a ""곳"" of the previous utterance and ""곳" (AT),"(AT), the current interpretation result, are attentive to each other.

Figure 5:
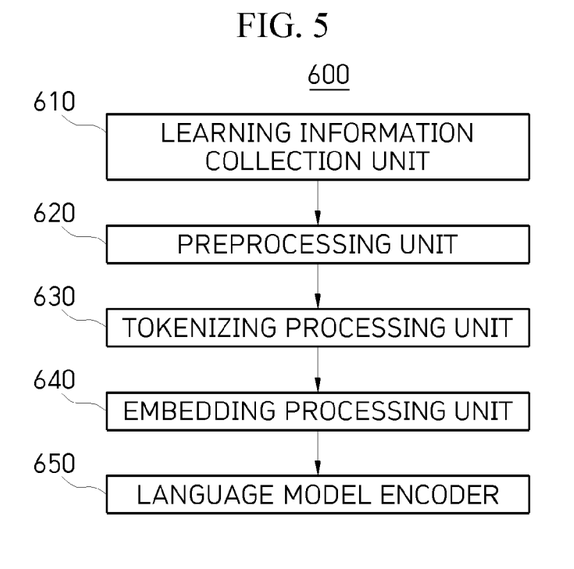
FIG. 5 is a configuration block diagram for describing device for training a multilingual embedding language model of FIG. 1.

Meanwhile, the multilingual embedding language model is generated by the device for training a multilingual embedding language model 600.

As illustrated in FIG. 5, a device for training a multilingual embedding language model 600 according to an embodiment of the present invention includes a learning information collection unit 610, a preprocessing unit 620, a tokenizing processing unit 630, an embedding processing unit 640, and a language model encoder 650.

The learning information collection unit 610 collects a sufficient amount of interpretation target language multilingual text to train the embedding language model. When text is collected for interpretation target languages to share as many tokens as possible, in the trained multilingual embedding language model, it is advantageous because interpretation target languages may be projected onto a similar space.

The preprocessing unit 620 deletes inappropriate symbols from the collected text or converts the inappropriate symbols into specific text.

The tokenizing processing unit 630 tokenizes the preprocessed text into syllables, words, word segments, byte pair encoding (BPE) tokens, or the like that have a preset length.

The embedding processing unit 640 performs multilingual text embedding. The embedding processing unit 640 may simultaneously use one or a plurality of methods of token embedding, segment embedding, and position embedding.

The language model encoder 650 generates a multilingual embedding language model by using techniques such as a masked language model and a next sentence prediction, attention, and the like so that the next context may also be predicted well.

Figure 6:
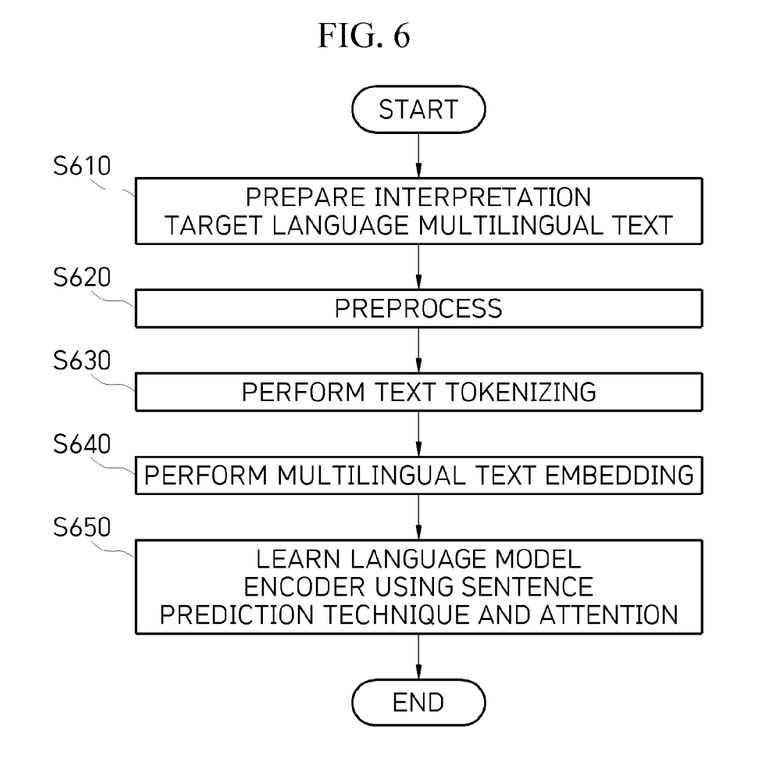
FIG. 6 is a flowchart illustrating a process of training a multilingual embedding language model according to an embodiment of the present invention.

A learning method of an apparatus for improving context-based automatic interpretation performance according to an embodiment of the present invention will be described with reference to FIG. 6.

A sufficient amount of interpretation target language multilingual text to train the embedding language model is prepared (S610). In this case, when text is collected for interpretation target languages to share as many tokens as possible, in the trained multilingual embedding language model, it is advantageous because interpretation target languages may be projected onto a similar space.

Next, messy text is refined and pre-processed (S620). The messy text is subjected to a preprocessing process that deletes data such as inappropriate symbols or converts the data to specific text.

A process of tokenizing text into syllables, words, word segments, or a byte pair encoding (BPE) tokens that have an appropriate preset length is performed (S630).

Thereafter, multilingual text embedding is performed in an advantageous way for context prediction by using token embedding, segment embedding, and position embedding (S640).

The language model encoder is trained using techniques such as a masked language model and next sentence prediction capable of predicting context well, attention, and the like (S650).

Here, the multilingual embedding language model may be, for example, a multilingual model of BERT (DOI: 10.18653/v1/N19-1423), but is not limited thereto.

Figure 7:
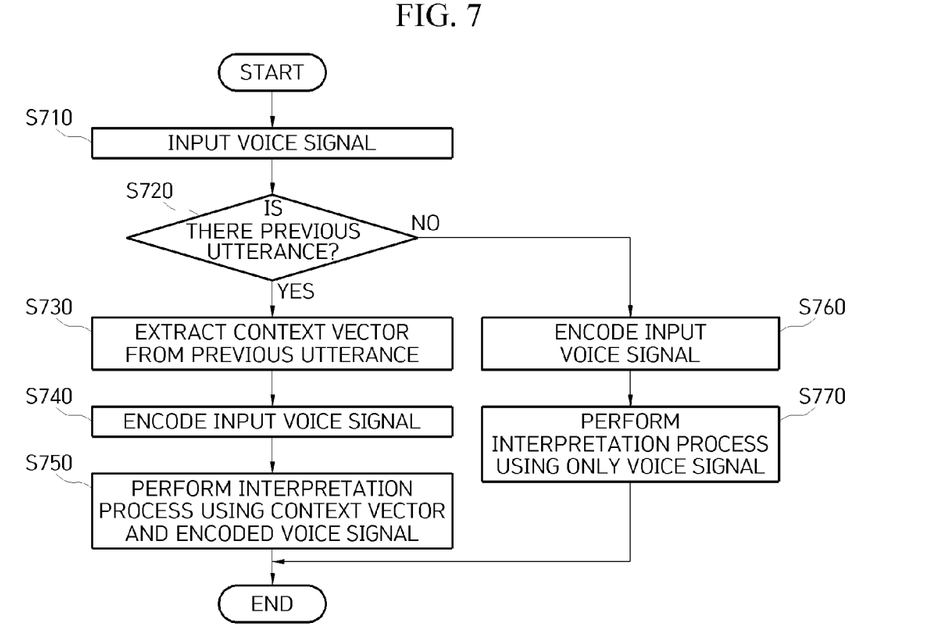
FIG. 7 is a flowchart illustrating an automatic interpretation process according to an embodiment of the present invention.

FIG. 7 is a flowchart illustrating an automatic interpretation process according to an embodiment of the present invention.

Before performing automatic interpretation, an automatic interpretation server, which includes a multilingual embedding language model-based context encoder, a voice encoder, and an interpretation decoder using the model described in FIGS. 1 to 3, is configured.

A voice signal is received from a user (S710).

Next, it is determined whether there is a previous utterance (S720).

When it is determined in the determination step (S720) that there is a previous utterance (YES), a context vector is extracted from the previous utterance using a context encoder (S730).

Thereafter, when a user's voice input is completed, a user's voice is encoded (S740).

The interpretation process is performed using the context vector and the encoded voice signal by the decoder (S750).

On the other hand, when there is no previous utterance (NO), only the user's voice signal is input to the voice encoder (S760).

Thereafter, the interpretation decoder performs an interpretation process using only the input user's voice signal (S770).

The multilingual embedding language model-based context encoder receives a previous utterance text and outputs a context vector, the voice encoder receives a voice signal and outputs a voice-encoded vector, and the interpretation decoder decodes both vector values and their attention to decode the interpretation result and output the interpretation result text.

Although the embodiment of the present invention has been described as an encoder-decoder structure, the present embodiment is not necessarily limited to this structure and may be applied to various deep neural network structures.

Figure 8:
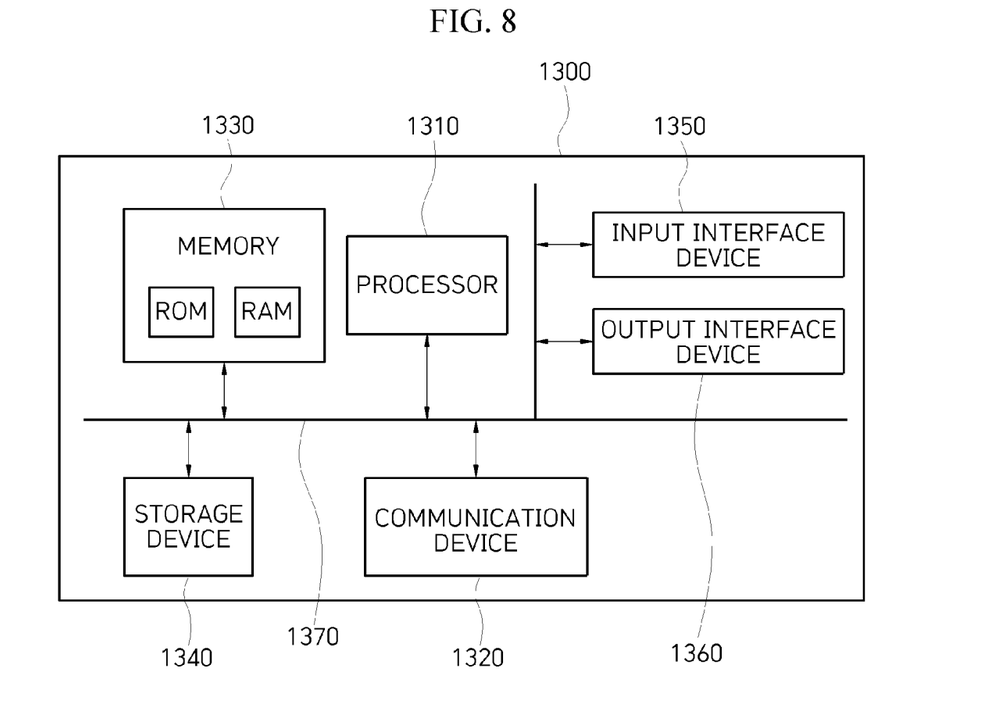
FIG. 8 is a block diagram illustrating a computer system for implementing the method according to the embodiment of the present invention.

FIG. 8 is a block diagram illustrating a computer system for implementing the method according to the embodiment of the present invention.

Referring to FIG. 8, a computer system 1300 may include at least one of a processing unit 1310, a memory 1330, an input interface device 1350, an output interface device 1360, and a storage device 1340 that communicate through a bus 1370. The computer system 1300 may also include a communication device 1320 coupled to a network. The processing unit 1310 may be a central processing unit (CPU) or a semiconductor device that executes instructions stored in the memory 1330 or the storage device 1340. The memory 1330 and the storage device 1340 may include various types of volatile or non-volatile storage media. For example, the memory may include a read only memory (ROM) and a random access memory (RAM). In the embodiment of the present disclosure, the memory may be located inside or outside the processing unit, and the memory may be connected to the processing unit through various known means. The memory may be various types of volatile or non-volatile storage media, and the memory may include, for example, a ROM or a RAM.

Accordingly, the embodiment of the present invention may be implemented as a computer-implemented method, or as a non-transitory computer-readable medium having computer-executable instructions stored thereon. In one embodiment, when executed by the processing unit, the computer-readable instructions may perform the method according to at least one aspect of the present disclosure.

The communication device 1320 may transmit or receive a wired signal or a wireless signal.

In addition, the method according to the embodiment of the present invention may be implemented in a form of program instructions that may be executed through various computer means and may be recorded in a computer-readable recording medium.

The computer-readable recording medium may include a program instruction, a data file, a data structure or the like, alone or a combination thereof. The program instructions recorded in the computer-readable recording medium may be configured by being especially designed for the embodiment of the present invention, or may be used by being known to those skilled in the field of computer software. The computer-readable recording medium may include a hardware device configured to store and execute the program instructions. Examples of the computer-readable recording medium may include magnetic media such as a hard disk, a floppy disk, and a magnetic tape, optical media such as a compact disk read only memory (CD-ROM) or a digital versatile disk (DVD), magneto-optical media such as a floptical disk, a ROM, a RAM, a flash memory, or the like. Examples of the program instructions may include a high-level language code capable of being executed by a computer using an interpreter, or the like, as well as a machine language code made by a compiler.

According to an embodiment of the present invention, an automatic interpretation server of the present invention receives a context vector of a previous utterance extracted from an interpretation result sentence or a recognition result sentence along with a voice signal of a current utterance, so it is possible to improve performance of an automatic interpretation system by extracting previous context information affecting the current utterance in addition to the currently input voice signal and using the extracted previous context information for the automatic interpretation.

In addition, even in a cascade system in which a speech recognizer and an automatic translator are connected step by step rather than an end-to-end automatic interpretation system, when inputting the speech recognizer or the automatic translator, it is possible to improve performance of individual speech recognizers and automatic translators by inputting a context vector value of a previous utterance together.

In addition, the present invention can be applied even in an automatic interpretation situation in which two or more n languages are mixed, and in this situation, when a multilingual embedding language model including all the languages is used, the same effects can be obtained.

Hereinabove, although the configuration of the present invention has been described in detail with reference to the accompanying drawings, this is merely an example, and those skilled in the art to which the present invention pertains can make various modifications and changes within the scope of the technical spirit of the present invention. Therefore, the protection scope of the present invention should not be limited to the above-described embodiments and should be defined by the description of the following claims.

What is claimed is:

1. An apparatus for improving context-based automatic interpretation performance, comprising: an uttered voice input unit configured to receive a voice signal from a user; a previous sentence input unit configured to transmit a user's previous utterance when the voice signal is input by the uttered voice input unit; a voice encoding processing unit configured to decode only the voice signal through the uttered voice input unit and transmit a vector; a context encoding processing unit configured to extract a context vector from a previous utterance transmitted through the previous sentence input unit when there is the previous utterance and transmit the extracted context vector of the previous utterance; and an interpretation decoding processing unit configured to output an interpretation result text by performing decoding on interpretation using vector attention information of an extracted voice signal and attention information of the extracted context vector of the previous utterance when it is determined by the previous sentence input unit that there is the user's previous utterance based on a multilingual embedding language model, when it is determined by the previous sentence input unit that there is no user's previous utterance, the interpretation decoding processing unit performing decoding using only the voice signal decoded through the voice encoding processing unit, wherein the multilingual embedding language model includes: a learning information collection unit configured to collect a sufficient amount of interpretation target language multilingual text to train the multilingual embedding language model; a preprocessing unit configured to delete an inappropriate symbol from the collected sufficient amount of interpretation target language multilingual text or convert the inappropriate symbol into preprocessed text; a tokenizing processing unit configured to tokenize the preprocessed text into a preset form; an embedding processing unit configured to embed the tokenized preprocessed text to correspond to multilingual text; and a multilingual embedding language model learning unit configured to train an embedded multilingual text.

2. The apparatus of claim 1, wherein the tokenizing is performed in a form of one of a syllable, a word, a word segment, or a byte pair encoding (BPE) token that has a preset length.

3. The apparatus of claim 1, wherein the embedding processing unit simultaneously uses one or a plurality of methods of token embedding, segment embedding, and position embedding.

4. The apparatus of claim 1, wherein the multilingual embedding language model learning unit trains a language model encoder by using a masked language model technique, a next sentence prediction technique, and attention.

5. The apparatus of claim 1, wherein the multilingual embedding language model transforms a dimensional space so that the interpretation target language is positioned in spaces similar to each other.

6. The apparatus of claim 1, wherein the multilingual embedding language model is to update a learning result using trained model weights after transforming architecture to a new purpose based on a previously trained multilingual embedding language model.

* * * * *